United States Patent [19]
Shamir

[11] Patent Number: 5,375,170
[45] Date of Patent: Dec. 20, 1994

[54] EFFICIENT SIGNATURE SCHEME BASED ON BIRATIONAL PERMUTATIONS

[75] Inventor: Adi Shamir, Rehovot, Israel

[73] Assignee: Yeda Research & Development Co., Ltd., Rehovot, Israel

[21] Appl. No.: 47,420

[22] Filed: Apr. 19, 1993

Related U.S. Application Data

[63] Continuation-in-part of Ser. No. 974,751, Nov. 13, 1992, Pat. No. 5,263,085.

[51] Int. Cl.$^5$ .................... H04K 1/00; H04L 9/00; H04C 9/02
[52] U.S. Cl. ........................ 380/30; 380/28; 380/44
[58] Field of Search ............... 380/28, 30, 44

[56] References Cited

U.S. PATENT DOCUMENTS

| | | | |
|---|---|---|---|
| 4,748,668 | 5/1988 | Shamir et al. | 380/30 |
| 4,932,056 | 6/1990 | Shamir | 380/30 |
| 4,987,593 | 1/1991 | Chaum | 380/30 |
| 4,995,082 | 2/1991 | Schnorr | 380/30 |
| 5,016,274 | 5/1991 | Micali et al. | 380/30 |

Primary Examiner—Stephen C. Buczinski
Attorney, Agent, or Firm—Keck, Mahin & Cate

[57] ABSTRACT

A birational permutation is a function f which is a one-to-one and onto mapping over k-tuples of numbers, where both f and its inverse are low degree rational functions. This patent describes a novel digital signature scheme which is based on a new class of birational permutations which have small keys and require few arithmetic operations.

14 Claims, 2 Drawing Sheets

EFFICIENT SIGNATURE SCHEME BASED ON BIRATIONAL PERMUTATIONS

This application is a continuation-in-part of application Ser. No. 07/974,751 filed Nov. 13, 1992 entitled "A Fast Signature Scheme Based On Sequentially Linearized Equations," now U.S. Pat. No. 5,263,085.

FIELD OF INVENTION

The present invention relates to an efficient signature scheme based on birational permutations and more particularly, relates to apparatus and method for carrying out same.

BACKGROUND OF THE INVENTION

The original proposal for public key cryptography (W. Diffie and M. E. Hellman, "New directions in cryptography", IEEE Trans. Information Theory, Vol. IT-22, pp. 644-654, November 1976.) was based on the notion of trapdoor permutations, i.e., invertible functions which are easy to compute but apparently difficult to invert, unless some trapdoor information (which makes the inversion easy) is known. The best known implementation of this idea is the RSA scheme, Rivest (Shamir and Adleman, "A method for obtaining digital signatures and public key cryptosystems", Communications of the ACM, Vol. 21, No. 2, pp. 120-126, February 1978) which can solve in a unified way the problems of key management, secure transmission, user identification, message authentication, and digital signatures. In one of the variants of this scheme, the encryption function is the low degree polynomial $f(x)=x^3$ (mod n) where n is the public product of two secret primes p and q. This function can be efficiently computed with two modular multiplications. Unfortunately, the inverse function $f^{-1}(x)=x^d$ (mod n) is a very high degree polynomial, and thus its evaluation is quite slow (especially in software implementations).

In spite of extensive research in the last 16 years, there had been no fundamentally new constructions of trapdoor permutations. To overcome this difficulty, researchers have developed specialized solutions to various cryptographic needs which are not based on this unifying notion. For example, Diffie and Hellman [1976] proposed a key management scheme which is based on the one way permutation of exponentiation modulo a prime. Since this function cannot be efficiently inverted, it is neither an encryption nor a signature scheme. The cryptosystem of Merkle and Hellman (R. C. Merkle and M. E. Hallman, "Hiding information and signatures in trapdoor knapsacks", IEEE Trans. Information Theory, Vol. IT-24, pp. 525-530, September 1978.) is invertible, but its mapping is not onto and thus it can not generate digital signatures. The Fiat-Shamir (Fiat and Shamir, "How to prove yourself: practical solutions to identification and signature problems", Proc. Crypto 86, pp. 186-194 August 1986.) and DSS ("DSS: specifications of a digital signature algorithm", National Institute of Standards and Technology, Draft, August 1991.) signature schemes are not one-to-one mappings, and thus they can not be used as cryptosystems.

A natural approach to the construction of efficient trapdoor permutations is to find low degree algebraic mappings (polynomials or rational functions) whose inverses are also low degree algebraic mappings. Such mappings are called birational functions. We are particularly interested in multivariate mappings $f(x_1, \ldots, x_k)=(v_1, \ldots, v_k)$ in which the $x_i$ and the $v_i$ are numbers modulo a large n=pq, since the solution of general algerbraic equations of this type is at least as hard as the factorization of the modulus. In this context, we say that a polynomial is low degree if its degree is a constant which does not grow with n, and a rational function is low degree if it is the ratio of two low degree polynomials. For example, in the case of cubic RSA, the function is considered low degree, but its inverse is not. General algebraic mappings do not usually have unique inverses, when they do have inverses they usually cannot be written in closed form, and when the closed forms exist they are usually based on root extractions (radicals) or exponentiations whose computation modulo a large n is very slow. The construction of good birational mappings is thus a non-trivial task.

One attempt to construct birational permutations was reported in Fell and Diffie (H. Fell and W. Diffie, "Analysis of a public key approach based on polynomial substitution", Proceedings of Crypto 1985, pp. 340-349.). It used the following DES-like idea:

Let $(x_1, x_2, \ldots, x_k)$ be an initial k-vector of variables, and let $g(x_2, \ldots, x_k)$ be a secret multivariate polynomial. Alternately replace the current k-vector of multivariate polynomials $(p_1, p_2, \ldots, p_k)$ by $(p_1+g(p_2, \ldots p_k), p_2, \ldots, p_k)$, and rotate the k-vector to the right. After sufficiently many iterations, expand and publish the resultant k-vector of multivariate polynomials as your public key. The function f is evaluated on input $(a_1, a_2, \ldots, a_k)$ by substituting the $a_i$'s into the $x_i$'s in the k published multivariate polynomials, and computing their values $(b_1, b_2, \ldots, b_k)$. When the trapdoor information g is known, the inverse of f can be computed by undoing the transformations (i.e., by alternately subtracting $g(p_2, \ldots, p_k)$ from $p_1$ and rotating the k-vector to the left). Unfortunately, even when g is a quadratic function, the number of terms can be squared in each iteration, and thus the size of the public key can grow double exponentially with the number of iterations, which cannot be too small for security reasons. As the authors themselves conclude, "there seems to be no way to build such a system that is both secure and has a public key of practical size".

A different approach was taken in Shamir (Shamir [1992] is: "Fast signature scheme based on sequentially linearized equations" patent application Ser. No. 07/974,751, filed Nov. 13, 1992, U.S. Pat. No. 5,263,085 granted Nov. 16, 1993.). Its basic idea is to use k triangular polynomials $g_i(y_1, \ldots, y_i)$, i=1, ... k of degree two in which the last variable $y_i$ in each polynomial $g_i$ occurs linearly. The algebraic mapping $(v_1, \ldots, v_k)=g(y_1, \ldots, y_k)$ k-tuples of numbers modulo n defined by the equations $v_i=g_i(y_1, \ldots, y_i)$ (mod n), i=1, ..., k is easy to evaluate since the $g_i$'s are low degree polynomials. The inverse of the mapping for a given k-tuple $(v_1, \ldots, v_k)$ is also easy to compute since the equations are sequentially linearizable: If we already know $y_1, \ldots, y_{i-1}$, we can substitute them into the equation $v_i=g_i(y_1, \ldots, y_i)$ (mod n), and get a linear equation in the single remaining variable $y_i$ which is easy to solve. To hide the obvious triangular shape of the equations, we use a random linear transformation y=AX (mod n) which replaces each $y_j$ in each $g_i$ by some linear combination of $x_1, \ldots, x_k$. The resultant polynomials $f_i(x_1, \ldots, x_k)$ look like general quadratic polynomials, except the first $f_1$ which remains linear. The mapping from $(x_1, \ldots, x_k)$ to $(v_1, \ldots, v_k)$ in which $v_i = f_i(x_1, \ldots, x_k) \pmod{n}$ for $i = 1, \ldots, k$, is thus a birational permutation f.

Birational permutations cannot be used in a direct way as public key cryptosystems due to the following generic attack: If f is known, the cryptanalyst can prepare a large number of input-output pairs for this function. Since f is invertible, these pairs (in reverse order) can be used to interpolate the unknown low-degree function $f^{-1}$ by solving a small number of linear equations relating its coefficients. This attack discouraged the serious study of cryptographic birational permutations in the literature.

SUMMARY OF INVENTION

The invention describes a novel method and apparatus for using a birational permutation as a public key signature scheme and more particularly a novel family of public key signature schemes using algebraic bases. These and other objects of the present invention will become evident from the following description of a preferred embodiment of the invention when taken in conjunction with the drawing.

DETAILED DESCRIPTION OF A PREFERRED EMBODIMENT

Figure 1:
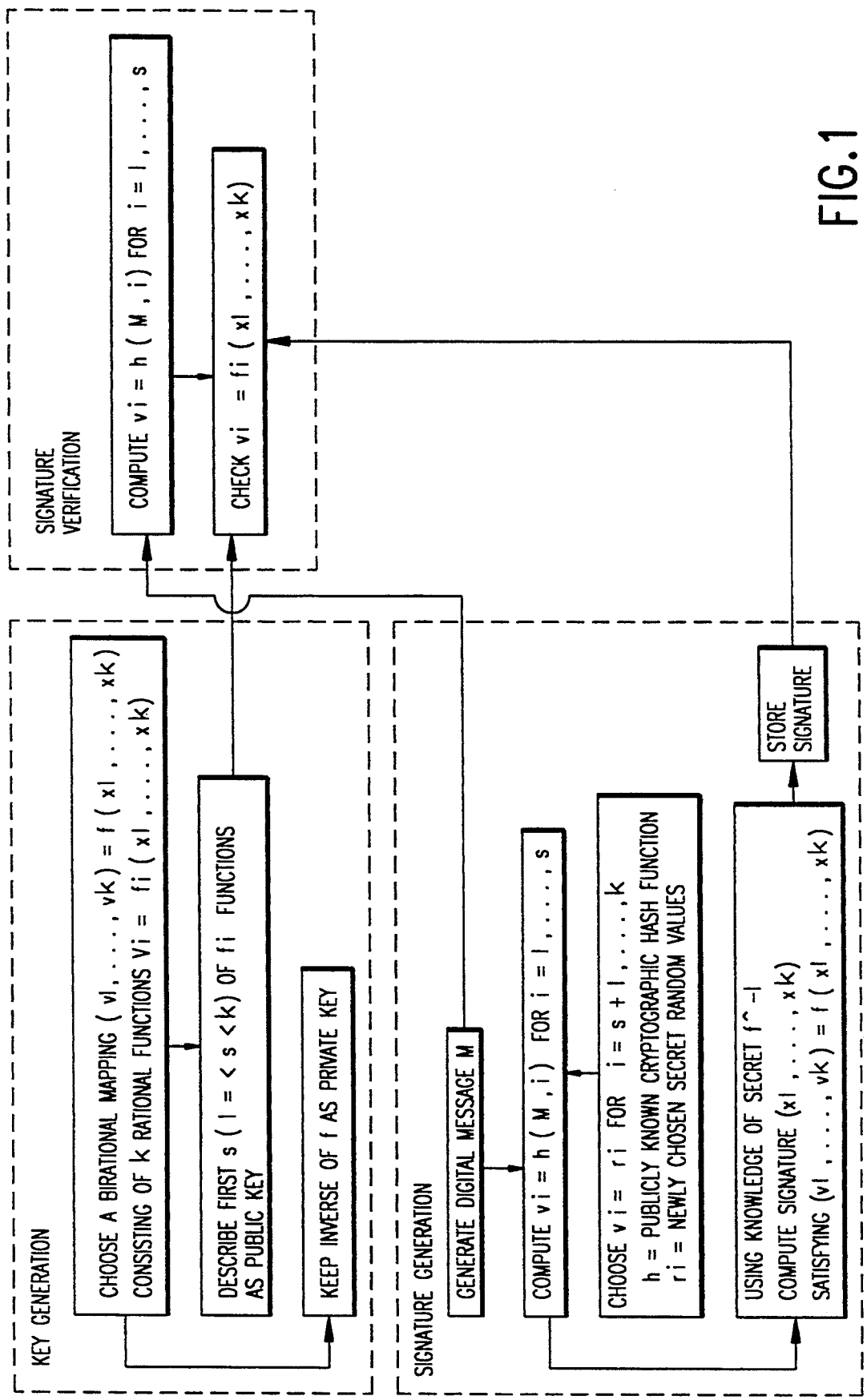
FIGS. 1 and 2 of the drawing are schematic showings, in block diagram form, of the signature scheme of the present invention, in particular, showing key generation, signature generation and signature verification illustrating the method and apparatus of the general public key signature scheme and its particular implementation using algebraic bases.

Referring now to the drawing, the basic steps and structure of the method and apparatus of the present invention implementing the efficient signature scheme based on birational permutations will now be described in detail. The description will be by reference to the various steps of the novel method, however, the apparatus employed to effect the various step and to carry out the invention, will be evident as a means to carry out the prescribed function. Known data processing equipment and the manner of programming same to carry out the method, will be evident from the algorithms given and otherwise, to give effect to the present invention will be readily apparent to those of ordinary skill in this art from the following detailed elaboration of the invention.

With reference to FIG. 1 the key generation, signature generation and signature verification are carried out as follows:

KEY GENERATION:
1. Each user chooses a birational mapping $(v_1, \ldots, v_k) = f(x_1, \ldots, x_k)$ consisting of $k > 1$ rational functions $v_i = f_i(x_1, \ldots, x_k)$.
2. Each user describes the first s $(1 \leq s < k)$ of these $f_i$ functions in his public key, and keeps the inverse of f as his private key.

SIGNATURE GENERATION:
1. Given a digital message M, the signer computes $v_i = h(M,i)$ for $i = 1, \ldots, s$ and chooses $v_i = r_i$ for $i = s+1, \ldots, k$, where h is a publicly known cryptographic hash function and $r_i$ are newly chosen secret random values.

2. The signer uses his knowledge of the secret $f^{-1}$ to compute a signature $(x_1, \ldots, x_k)$ satisfying $(v_1, \ldots, v_k) = f(x_1, \ldots, x_k)$. This signature is either stored or transmitted to the verifier along with M.

SIGNATURE VERIFICATION:
1. The verifier computes $v_i = h(M,i)$ for $i = 1, \ldots, s$ and checks that each $v_i$ satisfies $v_i = f_i(x_1, \ldots, x_k)$ where the $f_i$'s are taken from the signer's public key.

The above scheme cannot be used as a public key cryptosystem, since the clear text $(x_1, \ldots, x_k)$ cannot be uniquely recovered from the shorter ciphertext $(v_1, \ldots, v_s)$.

The scheme can be used as a signature scheme, since there is no requirement that each message should have only one signature. The recommended choice of s is $k - 1$, which makes the verification condition hardest to satisfy. The cryptanalyst cannot interpolate $f^{-1}$ since it is not uniquely defined by the public key. He cannot generate by himself complete input-output pairs, and cannot use input-output pairs generated by the legitimate signer since each one of them is based on new unknown values $r_i$.

The security of this scheme depends on the choice of birational permutations. For example, linear birational permutations are insecure since the s simultaneous equations $v_i = f_i(x_1, \ldots, x_k)$ for $i = 1, \ldots, s$ can be easily solved even when the other k-s functions $f_{s+1}, \ldots, f_k$ are not specified. When the $f_i$ functions are non-linear, there are no general techniques for solving s equations in k unknowns, and the problem becomes particularly difficult when the equations are modulo a large public n with secret factorization $n = pq$. In the case of the birational permutation described in Shamir [1992], the first equation $v_1 = f_1(x_1, \ldots, x_k)$ is linear and could be used by the cryptanalyst to eliminate one of the $x_i$'s. Since it is a potential vulnerability, it should be among those dropped from the public key.

In addition to this general scheme, a novel construction of birational permutations is proposed which seems to combine low complexity with high security. To make its formal definition clearer, it will be demonstrated first with a small example, based on the (totally insecure) choice of $p = 7$, $q = 13$, $n = pq = 101$.

Let K be the following $3 \times 6$ matrix of numbers modulo n:

$$K = \begin{bmatrix} 62 & 78 & 41 & 26 & 72 & 89 \\ 92 & 44 & 74 & 48 & 55 & 32 \\ 9 & 51 & 43 & 96 & 34 & 53 \end{bmatrix}$$

The input to the birational permutation is a triplet of numbers $x_1, x_2, x_3$ in $Z^*_n$ (i.e., each $x_i$ is relatively prime to n). Its output is another triplet of numbers $v_1, v_2, v_3$ whose computation uses coefficients from K in the following way:

$v_1 = 63x_1 + 78x_2 + 41x_3 + 26x_3x_1/x_2 + 72x_1x_2/x_3 + 89 - x_2x_3/x_1 \pmod{101}$ (*)

$v_2 = 92x_1 + 44x_2 + 74x_3 + 48x_3x_1/x_2 + 55x_1x_2/x_3 + 32 - x_2x_3/x_1 \pmod{101}$ (**)

$v_3 = 9x_1 + 51x_2 + 43x_3 + 96x_3x_1/x_2 + 34x_1/x_2/x_3 + 53 - x_2x_3/x_1 \pmod{101}$. (***)

Given the values $V_1$, $V_2$, $V_3$, these are three non-linear modular equations in three unknowns $x_1$, $x_2$, $x_3$. Such equations do not usually have closed form solutions. However, K was chosen with a hidden structure which makes their inversion possible. Let C and S be the following two matrices:

$$C = \begin{bmatrix} 302451 \\ 463171 \\ 177197 \end{bmatrix}$$

$$S = \begin{bmatrix} 297545744245 \\ 467214996158 \\ 15846873177 \end{bmatrix}$$

which are related in a non-linear way to K. To invert the birational permutation, the user first computes $W=CV \pmod n$, and then recovers the original input by using coefficients from S to compute:

$x_1 = 29w_1 + 75w_2 + 45w_3 + 74w_3w_1/w_2 + 42w_1w_2/w_3 + 45w_2w_3/w_1 \pmod{101}$ $x_2 = 46w_1 + 72w_2 + 14w_3 + 99w_3w_1/w_2 + 61w_1w_2/w_3 + 58w_2w_3/w_1 \pmod{101}$ $x_3 = 1w_1 + 58w_2 + 46w_3 + 87w_3w_1/w_2 + 31w_1w_2/w_3 + 77w_2w_3/w_1 \pmod{101}$.

Note that the application and inversion of the function have essentially the same form. They use a small number of modular additions multiplications and divisions but no root extractions. As a result, they can be implemented efficiently even when n is a full size ($\geq 512$ Bit) modulus.

To use this birational permutation as a signature scheme, the signer chooses the $3 \times 6$ matrix K but publishes only its first two rows as his public key. Given a digital document M, the signer computes $v_1 = h(M,1)$, $v_2 = h(M,2)$, $v_3 = r$ where h is a hash function and r is a new random number. He then computes the signature $(x_1, x_2, x_3)$ by using his secret key, and sends the message and its signature (but not r) to the verifier. The validity of the signature can now be verified by checking that equations (*) and (**) (whose coefficients are taken from the signer's public key) are valid.

The theory behind the new birational permutation will now be explained. Let $Fd[y_1, y_2, \ldots, y_k]$ denote the set of all the homogeneous polynomials of degree d in the k variables $y_1, y_2, \ldots, y_k$. In particular consider the case of quadratic polynomials (d=2) whose general form is:

$$\Sigma i = 1, \ldots k \quad \Sigma j = i, \ldots, k \quad a_{ij}y_iy_j$$

Any such polynomial can be viewed as a linear combination of the $k(k+1)/2$ elementary quadratics $y_iy_j$ for $i \leq j$ with the coefficient vector $(a_{11}, a_{12}, \ldots, a_{kk})$. Any set of quadratics with this property is called a linear basis of $F2[y_1, \ldots, y_k]$.

By allowing the additional operations of multiplication and (remainder-free) division of polynomials, we can express some of the elementary quadratics by other elementary quadratics. For example, the standard linear basis of $F2[y_1, y_2, y_3]$ is $\{y_1^2, y_2^2, y_3^2, y_1y_2, y_1y_3, y_2y_3\}$. However, the first three elementary quadratics can be expressed by the last three in the following way:

$y_1^2 = (y_1y_2)(y_1y_3)/(y_2y_3)$, $y_2^2 = (y_1y_2)(y_2y_3)/(y_1y_3)$, $y_3^2 = (y_1y_3)(y_2y_3)/(y_1y_2)$.

We can thus reduce the six linear generators $\{y_1^2, y_2^2, y_3^2, y_1y_2, y_1y_3, y_2y_3\}$ into the three algebraic $\{y_1y_2, y_1y_3, y_2y_3\}$. Another triplet of algebraic generators is $\{y_1^2, y_1y_2, y_2y_3\}$. However, $\{y_1^2, y_2^2, y_2y_3\}$ does not algebraically generate $F2[\{Y_1, y_2, y_3\}]$ since it cannot express $y_1y_2$.

To formalize this notion, consider an arbitrary set G of polynomials over a ring R. The algebraic closure [G] of G is defined in the following way:
1. R and G belong to [G].
2. If f and g belong to [G], then $f+g$, $f-g$, fg also belong to [G].
3. If f and $g=0$ belong to [G] and g divides f (without remainder) then f/g also belongs to [G].

Note that [G] is not necessarily an ideal in the ring of polynomials over R, since arbitrary polynomials are not allowed as coefficients of the generators. For example, when $G=\{y^2\}$, [G] is the set of all the polynomials in y whose monomials have even degrees. Note further that root extractions (radicals) are not allowed as basic operations, since they cannot be carried out efficiently in some rings R.

A set G is called redundant if some $g_i$ in G belongs to $[G-\{g_i\}]$. A non-redundant set G is called an algebraic basis of F if F is contained in [G]. Note that [G] can contain additional polynomials. One can easily prove:

Theorem:
1. The set $\{y_1^2, y_1y_2, y_2y_3, \ldots, y_{k-1}y_k\}$ is an algebraic basis of $F2[y_1, y_2, \ldots, y_{kk}]$ for any k.
2. The set $\{y_1y_2, y_2y_3, y_3y_4, \ldots, y_ky_1\}$ is an algebraic basis of F2 $[y_1, y_2, \ldots y_k]$ for any odd $k>1$.

Proof: It can be shown that the specified sets can generate all the other elementary quadratics $y_iy_j$ for $i \leq j$. Assume first that $j-i$ is an odd number. Then one can use the telescoping formula:

$y_iy_j = (y_iy_{i+1})(y_{i+2}y_{i+3}) \cdots (y_{j-1}y_j)/(y_{i+1}y_{i+2}) \cdots (y_{j-2}y_{j-1})$.

If $j-i$ is an even number, this approach will yield $y_i/y_j$ instead of $y_iy_j$. To turn the former into the later, we have to multiply it by $y_j^2$. In case 1, $y_1^2$ is given as a generator, and one can turn each $y_t^2$ into $y_{t+1}^2$ by using the formula:

$y_{t+1}^2 = (y_ty_{t+1})^2/y_t^2$.

In case 2, the fact is used that k is odd, and therefore the distance from j to j via the cyclic order $y_j, y_{j+1}, \ldots, y_k, y_1, \ldots, y_j$ is odd. The telescoping formula will thus yield the desired $y_j^2$ if we cycle through all the variables $y_t$. Q.E.D.

The theorem gives two types of algebraic bases of size k for $F2[y_1, y_2, \ldots, y_k]$. To get other bases, we can use the following transformations:

Theorem: Let $G=\{g_1, \ldots, g_k\}$ be an algebraic basis for $Fd\{y_1, \ldots, y_k\}$, and let A and B be two kxk invertible linear transformations. Let G' be the result of applying A to the variables in G (i.e., replacing each $y_i$ by a linear combination of $y_j$'s), and let G'' be the result of applying B to the generators in G' (i.e., replacing each $g'_i$ in G' by a linear combination of $g'_j$'s). Then G" is also an algebraic basis of $Fd[y_1, \ldots, y_k]$.

Proof: Due to the invertible and algebraic nature of these transformations, it is easy to translate the representation of each f in the original basis G into a representation of f in the new bases G' and G". Q.E.D.

EXAMPLES:

Consider the algebraic basis $G = \{y_1y_2, y_2y_3, y_3y_1\}$ of $F2[y_1, y_2, y_3]$, and the randomly chosen linear transformations:

$$A = \begin{bmatrix} 376271 \\ 894568 \\ 501793 \end{bmatrix}$$

$$B = \begin{bmatrix} 417351 \\ 891260 \\ 379419 \end{bmatrix}$$

Then the linear change of variables $y \leftarrow Ay \pmod{101}$ changes the generators $g_i$ in G into:

$$g'_1 = (37y_1 + 62y_2 + 71y_3)(89y_1 + 45y_2 + 68y_3) \pmod{101}$$
$$= 12y_1y_2 + 38y_2y_3 + 48y_3y_1 + 61y_1^2 + 63y_2^2 + 81y_3^2$$

$$g'_2 = (89y_1 + 45y_2 + 68y_3)(50y_1 + 17y_2 + 93y_3) \pmod{101}$$
$$= 26y_1y_2 + 89y_2y_3 + 62y_3y_1 + 6y_1^2 + 58y_2^2 + 62y_3^2$$

$$g'_3 = (50y_1 + 17y_2 + 93y_3)(37y_1 + 62y_2 + 71y_3) \pmod{101}$$
$$= 93y_1y_2 + 4y_2y_3 + 22y_3y_1 + 32y_1^2 + 44y_2^2 + 38y_3^2$$

and the linear transformation $G'' \leftarrow BG' \pmod{101}$ changes the generators $g'_i$ in G' into:

$$g''_1 = 41g'_1 + 73g'_2 + 51g'_3 \pmod{101}$$
$$= 63y_1y_2 + 78y_2y_3 + 41y_3y_1 + 26y_1^2 + 72y_2 + 89y_3^2$$

$$g''_2 = 89g'_1 + 12g'_2 + 60g'_3 \pmod{101}$$
$$= 92y_1y_2 + 44y_2y_3 + 74y_3y_1 + 48y_1^2 + 55y_2^2 + 32y_3^2$$

$$g''_3 = 37g'_1 + 94g'_2 + 19g'_3 \pmod{101}$$
$$= 9y_1y_2 + 51y_2y_3 + 43y_3y_1 + 96y_1^2 + 34y_2^2 + 53y_3^2.$$

In the original basis G it was easy to find the representation of any given quadratic polynomial f as an algebraic expression in the $g_i$'s. In a transformed basis G" it is less obvious how to find such a representation, even though its existence is guaranteed.

To simplify notation, assume without loss of generality that k is odd and G is always the symmetric basis $(y_iy_{i+1})$ (where $i+1$ is computed mod k). Given the invertible linear transformation $Y \leftarrow AY$, we define A&A as the $k \times k(k+1)/2$ matrix whose i-th row represents the quadratic polynomial $y_iy_{i+1}$ after the change of variables. The coefficients of the final basis G" can thus be compactly represented by the $k \times k(k+1)/2$ matrix B*(A&A).

Assume now that one is given an arbitrary assignment of values $x_1, \ldots, x_k$ to the elementary quadratics $y_1y_2, y_2y_3, \ldots, y_ky_1$ in the standard basis of $F2[y_2, \ldots, y_k]$ (one can use the algebraic independence of these generators to make any such assignment consistent, without actually finding the values of the individual $y_i$'s). One can use the telescoping formulas to compute the values of all the $k(k+1)/2$ elementary quadratics $y_iy_j$ for $i \leq j$. Denote this extended version of X by E(X), and note that it increases the height of the column vector from k to $k(k+1)/2$. The values of the k generators in G" for this assignment X can be computed by the matrix-vector product $V = [B*(A\&A)] [E(X)]$. Note again the nonlinearity of this transformation, which is due to the quadratic computation of the coefficients of A&A from the coefficients of A, and the multiplications and divisions required to extend X into E(X).

This function maps the k-vector X into the k-vector V. The goal of the invention now is to invert this function and recover the original values in X when A and B are known. First, one can undo the effect of B by computing $W = CV$ where $C = B^{-1}$, and obtain the relationship $W = [A\&A](E(X))$. By definition, the values $w_i$ in W are the values of the generators $g'_i$ in the intermediate G'.

Since G' is an algebraic basis, it can represent any quadratic polynomial in $F2[y_1, \ldots, y_k]$ as an algebraic expression in the generators $g'_i$. In particular, it can represent the k elementary quadratics $y_iy_{i+}$, and thus it can be recovered by evaluating an appropriate algebraic expression in the values $w_1, w_2, \ldots, w_k$. It is easy to check that these algebraic expressions can be compactly represented as $X = [A^{-1} \& A^{-1}][E(W)]$.

EXAMPLE (continued)

Consider the algebraic bases G, G' and G" of the previous example. Let $x_i$ denote the value of $y_iy_{i+1}$, i.e.:

$$y_1y_2 = x_1 \quad y_2y_3 = x_2 \quad y_3y_1 = x_3. \pmod{101}$$

The values of the other three elementary quadratics can be expressed as:

$$y_1^2 = x_3x_1/x_2 \quad y_2^2 = x_1x_2/x_3 \quad y_3^2 = x_2x_3/x_1. \pmod{101}$$

The values $v_1$ of the generators $g''_i$ can now be computed as $[B*(A\&A)][E(X)]$, i.e.:

$v_1 = 63x_1 + 78x_2 + 41x_2 + 26x_3x_1/x_2 + 72x_1x_2/x_3 + 89x_1x_2/x_1 \pmod{101}$ $v_2 = 92x_1 + 44x_2 + 74x_3 + 48x_3x_1/x_2 + 55x_1x_2/x_3 + 32x_2x_3/x_1 \pmod{101}$ $v_3 = 9x_1 + 51x_2 + 43x_3 + 96x_3x_1/x_2 + 34x_1x_2/x_3 + 53x_2x_3/x_1 \pmod{101}$.

In particular, when the input is $x_1 = 1$, $x_2 = 2$, $x_3 = 3$, the output is $v_1 = 54$, $v_2 = 63$, $v_3 = 85$.

Consider now the problem of inverting this transformation: Given these values $v_1, v_2, v_3$, find $x_1, x_2, x_3$. First compute the matrix inverses:

$$A^{-1} = \begin{bmatrix} 358619 \\ 57813 \\ 407220 \end{bmatrix}$$

$$B^{-1} = \begin{bmatrix} 302451 \\ 463171 \\ 177197 \end{bmatrix}$$

Next, reverse the transformation $G'' \leftarrow BG'$ (mod 101) by computing $W = [B^{-1}]V$ (mod 101). When $v_1 = 54$, $v_2 = 63$, $v_3 = 85$, this matrix-vector product yields $w_1 = 94$, $w_2 = 69$, $w_3 = 1$, which are the values of the intermediate generators $g'_1, g'_2, g'_3$. We then extend this W into $E(W) = (w_1, w_2, w_3, w_3w_1/w_2, w_1w_2/w_3, w_2w_3/w_1)$ and compute $X = [A^{-1} \& A^{-1}][E(W)]$ (mod n), i.e.:

$$x_1 = 29w_1 + 75w_2 + 45w_3 + 74w_3w_1/w_2 + 42w_1w_2/w_3 + 45w_2w_3/w_1 \pmod{101}$$

$$x_2 = 46w_1 + 72w_2 + 14w_3 + 99w_3w_1/w_2 + 61w_1w_2/w_3 + 58w_2w_3/w_1 \pmod{101}$$

$$x_3 = 1w_1 + 58w_2 + 46w_3 + 87w_3w_1/w_2 + 31w_1w_2/w_3 + 77w_2w_3/w_1 \pmod{101}.$$

For $w_1 = 94$, $w_2 = 69$, $w_3 = 1$, the extension of W to E(W) yields (94,69,1,16,22,19). When these values are substituted into the expressions above, one gets the original inputs $x_1 = 1$, $x_2 = 2$, $x_3 = 3$.

A simple optimization technique can substantially improve the performance of this scheme. If B is chosen as the inverse of some kxk submatrix of A&A, then B*(A&A) contains a kxk identity submatrix and there is no need to specify these $k^2$ numbers. Example (continued): Assume that the same is used but choose a new B:

$$A\&A = \begin{bmatrix} 1 & 2 & 3848616381 \\ 2 & 68962 & 65862 \\ 93 & 4 & 22324438 \end{bmatrix}$$

$$B = \begin{bmatrix} 891642 \\ 141334 \\ 631413 \end{bmatrix}$$

$$B^*(A\&A) = \begin{bmatrix} 3 & 7 & 2527100 \\ 32 & 7 & 4010 \\ & & 65637001 \end{bmatrix}$$

Figure 2:
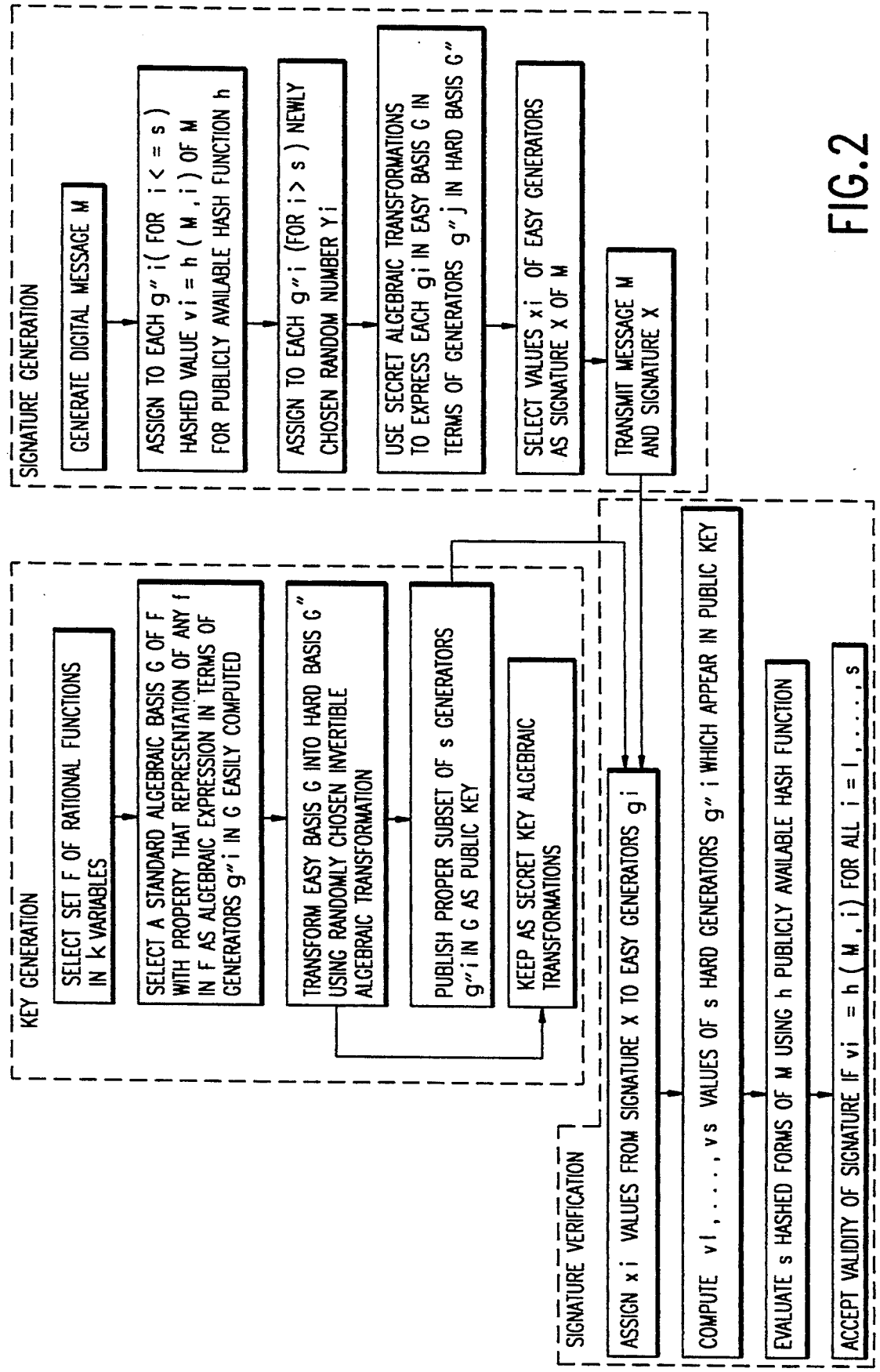

The birational permutation is now simplified to:

$$v_1 = 37x_1 + 25x_2 + 27x_3 + x_3x_1/x_2 \pmod{101}$$

$$v_2 = 32x_1 + 7x_2 + 4x_3x_1x_2/x_3 \pmod{101}$$

$$v_3 = 6x_1 + 56x_2 + 37x_3 + x_2x_3/x_1 \pmod{101},$$

which has a shorter description and requires fewer arithmetic operations. The formalization of the new implementation is described as follows with reference to FIG. 2:

KEY GENERATION:
1. Pick a set F of rational functions in k variables, and a standard algebraic basis G of F with the property that the representation of any f in F as an algebraic expression in terms of the generators $g_i$ in G can be easily computed.
2. Transform the easy basis G into a hard basis G'' by using randomly chosen invertible algebraic transformations.
3. Publish a proper subset of s generators $g''_i$ in G'' as the public key, and keep the algebraic transformations as the private key.

SIGNATURE GENERATION:
1. To sign a given message M, assign to each $g''_i$ with $i \leq s$ the hashed value $v_i = H(M,i)$ of M, and to each $g''_i$ with $i > s$ a newly chosen random number $r_i$.
2. Use the secret algebraic transformations to express each $g_i$ in the easy basis G in terms of the generators $g''_j$ in the hard basis G''. The values $x_i$ of the easy $g''_j$ form the signature X of M.

SIGNATURE VERIFICATION:
1. Assign the values $x_i$ from the signature X to the easy generators $g_i$, and compute the values $v_1, \ldots, v_s$ of the s hard generators $g''_i$ which appear in the signer's public key.
2. Evaluate the s hashed forms of M under the publicly available hash function h.
3. Accept the validity of the signature if $v_i = H(M,i)$ for all $i = 1, \ldots, s$.

The recommended choice for F is the set $Fd[y_1, \ldots, y_k]$ of all the homogeneous polynomials of degree d over the ring $Z_n$. The modulus n can be chosen either universally by a trusted center, or individually by each signer (this eliminates the center, but increases the complexity of the key generation process). It is recommended to choose n as the product of two large primes p and q, but the factorization can be destroyed as soon as n is chosen and published. The recommended choice for G is some set of monomials $y_1^{e_1} y_2^{e_2} \ldots y_k^{e_k}$ with $e_1 + e_2 + \ldots + e_k = d$ such that any other monomial in $Fd[y_1, \ldots, y_k]$ can be generated by a sequence of multiplications and divisions. It is not difficult to show that for any d and k, $Fd[y_1, \ldots, y_k]$ has an algebraic basis of this type which consists of exactly k monomials of degree d (for example, $g = \{y_1^3, y_2^2y_3, y_1y_2y_3\}$ is an algebraic basic for $F3[y_1, y_2, y_3]$). The problem with large choices of k and d is that the number of coefficients in the published generators G'' grows as $O(k^{(d+1)})$. However, for fixed d this key size grows only polynomially in k, and the recommended choice of d is 2. The recommended bases for $d = 2$ are the standard bases $G = \{y_1y_2, \ldots, y_{k-1}y_k, y_ky_1\}$ for odd k and $G = \{y_1^2, y_1y_2, \ldots, y_{k-1}y_k\}$ for arbitrary k. The minimum recommended value of k is currently $k = 3$, and the recommended choice of invertible algebraic transformations is a pair of randomly chosen kxk matrices A (which linearly transforms the variables) and B (which linearly transforms the equations).

The Security of the New Scheme

One can prove some partial results about the security of the new birational permutation for $d = 2$ and odd $k > 1$:

Theorem:
(a) Any algorithm for recovering the secret transformations A, B from the public generators defined by $K = B^*(A\&A)$ (mod n) can be used to factor n with the same complexity.
(b) This remains true even when B is known to be the inverse of some kxk submatrix in A&A.
(c) This remains true even when the public key consists of the first s rows in K.

(d) If K and one of A, B is known, the other can be easily computed.

(e) Any algorithm for recovering $y_1, \ldots, y_k$ from $v_1, \ldots, v_k$ can be used to factor n with the same complexity.

Proof (sketch):

(a) Due to the symmetry of the basis $G = \{y_i y_{i+1},\}$ the algebraic equations which relate the known coefficients of K to the unknown coefficients of A and B remain invariant under a cyclic rotation of the rows of A and columns of B. By using techniques developed in Shamir [1993], this can be used in order to prove that the recovery of A and B is at least as difficult as the factorization of n.

(b) Anyone can apply Gauss elimination to the published equations in order to bring them to this special form, and anyone can multiply this special form by a randomly chosen matrix B to bring it back to general form. Consequently, this cannot affect the security of the scheme.

(c) When less information is given to the cryptanalyst, the problem cannot become easier.

(d) If A is known, then B can be computed from K and A&A by linear algebra. If B is known, then A can be retrieved by calculating the polynomial GCD of consecutive pairs of rows in $B^{-1}K = A\&A$. For example, $GCD(y_1 y_2, y_2 y_3) = y_2$, and thus the GCD reveals the second row in A.

(e) Since the $y_i$'s occur quadratically in the published equations, the values of $v_1, \ldots, v_k$ remain invariant if one simultaneously negates the values of $y_1, \ldots y_k$. By using Shamir [1993] one can again prove that computing the $y_i$'s is at least as difficult as the factorization of n. Q.E.D.

The above theorem proves that the recovery of the original trapdoor is difficult. It does not rule out other attacks.

The theorem explains why two transformations are used—if one does not apply either A or B the scheme becomes insecure. The theorem also implies that bases G with $GCD(g_1, g_2, \ldots, g_k) = 1$ should be avoided—such a GCD remains nontrivial under the transformations $Y \leftarrow AY$ and $G'' \leftarrow BG'$, and its computation can reveal some of the rows of A. This condition is automatically satisfied in the standard bases G for $k > 2$. For example, when $k = 3$, two random linear combinations of $y_1 y_2$, $y_2 y_3$ and $y_3 y_1$ will almost surely be relatively prime.

The theorem proves that the computation of the $y_i$'s is difficult. However, it does not imply that the computation of the $x_i$'s (which is the real goal of the cryptanalyst) is also difficult.

In the case of the RSA function $f(x) = x^e \pmod{n}$, the cryptanalyst can exploit the relationships $f(x_1 * x_2) = f(x_1) * f(x_2) \pmod{n}$ and $f(cx) = (c^e)f(x) \pmod{n}$ where c is some known constant. In the new scheme the birational permutation f has a similar one-dimensional relationship $f(cx_1, cx_2, \ldots, cx_k) = cf(x_1, x_2, \ldots, x_k) \pmod{n}$. However since messages are hashed before they are signed and the minimum recommended value of k is 3, it is very unlikely that the cryptanalyst will ever encounter two vectors which are multiples of each other.

It is believed that there are two main possibilities for attack on the new signature scheme. The first is to consider the public key as a general system of s non-linear equations in k unknowns modulo a large n with unknown factorization. The second attack is to use the special structure of the public key in order to find the representation of the $x_i$'s in terms of the given rational functions. Since $s < k$, the s published functions do not form a basis for $Fd[x_1, \ldots, x_k]$, and thus the $x_i$'s are unlikely to have such representations. To overcome this difficulty, the cryptanalyst can search for $k-s$ additional functions which complete the published functions into a basis and make the representation feasible. So far, attempts to implement attacks of the above nature have not succeeded.

Although the invention has been shown and described in terms of a specific preferred embodiment and variants, changes and modifications are possible which do not depart from the spirit, scope or contemplation of the inventive concepts disclosed and taught herein. Such are deemed to fall within the purview of the invention as claimed.

What is claimed is:

1. A method of generating and verifying digital signatures comprising the steps of:

a) selecting a birational mapping $(v_1, \ldots, vk) = f(x_1, \ldots, x_k)$ comprising $k > 1$ rational functions $v_1 = f_i(x_1, \ldots, v_k)$;

b) selecting first $s(1 \leq s < k)$ of fi functions and using them as a public key;

c) maintaining inverse of f as a private key;

d) generating a digital message M;

e) computing $v_1 = h(M,i)$ for $i = 1, \ldots, s$ where h is a publicly known cryptographic hash function; selecting $v_1 = r_i$ for $i = s+1, \ldots, k$ where $r_i$ is a randomly chosen value;

g) computing signature $(x_1, \ldots, x_k)$ using inverse of f to satisfy $(v_1, \ldots, v_k) = f(x_1, \ldots, x_k)$;

h) transmitting to a verifier the digital message M, and the signature of step f); and i) verifying the signature of step f) of message M by computing $v_1 = h(M,i)$ FDR $i = 1, \ldots, s$ and checking that $v_1 = f_i(x_1, \ldots, x_k)$, where $f_1, \ldots, f_s$ is the signer's public key.

2. The method of claim 1 wherein the $f_i$ functions of step a) are non-linear.

3. The method of claim 2 wherein the equations of step a) are modulo a large public n with secret factorization.

4. A method of generating and verifying digital signatures comprising the steps of:

a) selecting a set F of rational functions in $k > 1$ variables;

b) selecting an algebraic basis G of F with the property that the representation of any f in F can be easily computed in terms of generators $g_i$ in G;

c) selecting invertible algebraic transformations and maintaining them as a private key;

d) transforming the easy basis G into a hard basis G'';

e) selecting a proper subset of $1 \leq s < k$ generators $g''_i$ in G as a public key;

f) generating a digital message M;

g) assigning to each $g''_i$ with $i \leq s$ the hashed value $v_1 = h(M,i)$ of M wherein h is a publicly known cryptographic hash function, and to each $g''_i$ with $i > s$ a random number $v_i = r_i$;

h) expressing each $g_i$ in the easy basis G in terms of generators $g''_j$ in the hard basis using private key of step d);

i) selecting the values $x_i$ of the easy generators of step i) as the signature X of M; and j) verifying the signature X by assigning the values $x_i$ from the signature to the easy generators $g_i$, computing values $v_1, \ldots, v_s$ of the s hard generators $g''_j$ of step f), evaluating the s hashed forms of M using h of step h) and checking that $v_1 = h(M,i)$ for all $i = 1, \ldots, s$.

5. The method of claim 4 wherein step c is carried out using invertible linear transformations.

6. The method of claim 5 wherein the computations are carried out modulo a large public n with secret factorization.

7. The method of claim 6 where F is the set $Fd[y_1, \ldots, y_k]$ of homogeneous polynomials of degree d in k variables, and G is a set of monomials $y_1^{e_1} y_2^{e_2} \ldots y_k^{e_k}$ with $e_1 + e_2 + \ldots + e_k = d$ such that any other monomial in $Fd[y_1, \ldots, y_k]$ can be generated by a sequence of multiplications and divisions.

8. The method of claim 7 where $d = 2$ and G is either $\{y_1 y_2, \ldots, y_{k-1} y_k, y_k y_1\}$ for odd k or $\{y_1^2, y_1 y_1, \ldots, y_{k-1} y_k\}$ for arbitrary k.

9. Apparatus for generating and verifying digital signatures comprising
  a) means for selecting a birational mapping $(v_1, \ldots, v_k) = f(x_1, \ldots, x_k)$ comprising $k > 1$ rational functions $v_1 = f_i(x_1, \ldots, v_k)$;
  means for selecting first $1 = \leq s < k$ of $f_i$ functions and using them as a public key;
  c) means for generating a digital message M;
  d) means for computing $v_1 = h(M,i)$ for $i = 1, \ldots, s$ where h is a publicly known cryptographic hash function;
  e) means for selecting $v_1 = r_i$ for $i = s+1, \ldots, k$;
  f) means for computing signature $(x_1, \ldots, x_k)$ using inverse of f to satisfy $(v_1, \ldots, v_k) = f(x_1, \ldots, x_k)$;
  g) means for transmitting to a verifier the digital message M, the public key of b) and the signature of f); and
  h) means for verifying the signature of f) of message M by computing $v_1 = h(M,i)$ for $i = 1, \ldots, s$ and checking that $v_1 = f_i(x_1, \ldots, x_k)$.

10. The apparatus of claim 9 wherein the fi functions of a) are non-linear.

11. The apparatus of claim 10 wherein the equations of a) are modulo a large public n with secret factorization.

12. Apparatus for generating and verifying digital signatures comprising:
  a) means for selecting a set F of rational functions in $k > 1$ variables;
  b) means for selecting an algebraic basis G of F with the property that the representation of any f in F can be easily computed in terms of generators $g_i$ in G;
  c) means for selecting invertible algebraic transformation and maintaining them as a private key;
  d) means for transforming the easy basis G into a hard basis $G''$;
  e) means for selecting a proper subset of 5 generators $g''_i$ in G as a public key;
  f) means for generating a digital message M;
  g) means for assigning to each $g''_i$ with $i \leq s$ the hashed value $v_i = h(M,i)$ of M wherein h is a publicly known cryptographic hash function, and to each $g''_i$ with $i > s$ a random number $v_i = n_i$;
  h) means for expressing each $g_i$ in the easy basis G in terms of generators $g''_j$ in the hard basis using the private key of d);
  i) means for selecting the values $x_i$ of the easy generators of i) as signature X of M; and
  j) means for verifying the signature X by assigning the values $x_i$ from the signature to the easy generators $g_i$, computing $v_1, \ldots, v_s$ of the S hard generators $g''_j$ of f), evaluating the S hashed forms of M using h of step h) and checking that $v_1 = h(M,i)$ for all $i = 1, \ldots, s$.

13. Apparatus of claim 12 wherein the means of c) or d) carries out its function using invertible linear transformations.

14. Apparatus of claim 13 wherein the computations are carried out modulo a large public n with secret factorization.

* * * * *